Oct. 16, 1928.
P. PASCHEN
1,687,686
TEMPERATURE COMPENSATING DEVICE
Filed July 23, 1925
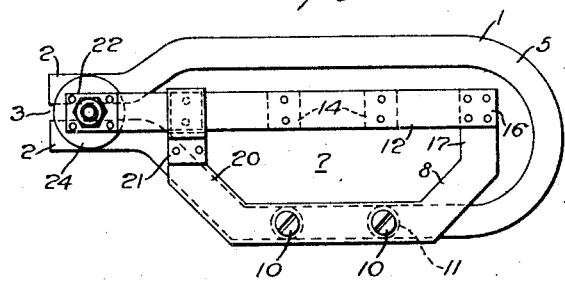
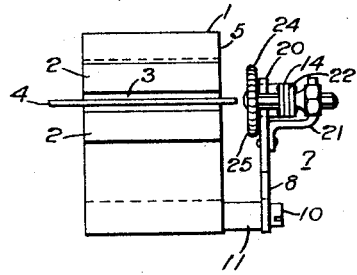
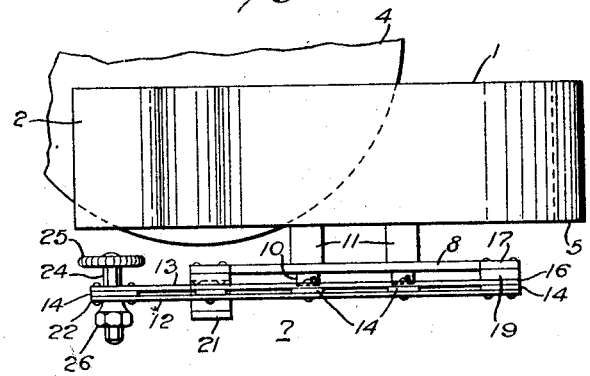
WITNESSES:
G. S. Neilson
F. H. Miller
INVENTOR
Paul Paschen
BY
Wesley G. Carr
ATTORNEY Patented Oct. 16, 1928.

1,687,686

UNITED STATES PATENT OFFICE.

PAUL PASCHEN, OF NUREMBERG, GERMANY, ASSIGNOR TO WESTINGHOUSE ELECTRIC & MANUFACTURING COMPANY, A CORPORATION OF PENNSYLVANIA.

TEMPERATURE-COMPENSATING DEVICE.

Application filed July 23, 1925, Serial No. 45,560, and in Germany May 27, 1924.

My invention relates to temperature compensating devices and particularly to devices for correcting the errors due to damping action in watthour meters in accordance with temperature changes.

One object of my invention is to provide a device of the above-indicated character that shall retain its operating characteristics over a relatively longer period of time than certain other devices that have heretofore been suggested for use in watthour and similar meters.

Another object of my invention is to provide a magnetizable member and temperature-responsive means for so symmetrically moving the same relative to both poles of a magnet as to substantially equally affect the north and south pole fluxes.

A further object of my invention is to provide a temperature compensating device for watthour meters that shall be simple and durable in construction, economical to manufacture and effective in its operation.

In any of the suggestions of which I am aware, the keeper or shunt member is so moved relative to the magnet or its poles as to fail to accomplish its purpose to the degree of efficiency desired. In certain of these suggestions, it is thought that deficiency is occasioned by the fact that the keeper affects one pole of the magnet more than the other.

In the bimetallic differentially-acting temperature-responsive element art, early experiment and practice suggested the expediency of mechanically connecting the differentially-acting elements, as by rivets. This practice was considered crude compared to the later development whereby the elements were brazed or rolled together in intimate surface-to-surface contact and it was only later discovered that the brazed or rolled elements were more subject to overstressing and quicker destruction of the calibration characteristics than certain of the orginally suggested devices.

The subject of adequately correcting the action of the damping magnets in watthour meters has been exceedingly troublesome and has directed much thought toward its solution.

Many features, such as the lack of space, and the lack of a suitable temperature-responsive device that would not change its calibration characteristics, have contributed to the difficulty of compensating watthour and similar meters for temperature changes in a simple, economical, practical and effective manner.

In those suggestions, that are similar to mine in that they propose to use a movable magnetizable member or keeper to shunt more or less of the damping-magnet flux, space considerations and other factors have heretofore prevented, so far as I am aware, the provision of a keeper that properly affects the damping flux and a temperature-responsive element that retains its characteristics.

In view of the above, I propose, by the expedient of moving a keeper symmetrically toward and away from both poles of a magnet and the combining therewith, and with a watthour meter, a bimetallic element that is so mounted and disposed relative to the magnet in the meter, and in which the bimetallic elements are so connected to each other, as to provide a meter in which the temperature compensating means is not only more effective but which will retain its characteristics for a longer period.

It has been found that, to move a keeper member along a certain path, as in a direction normal to a median plane of a magnet opposite the poles thereof, and to mount a bimetal element in a certain relation in a meter to the magnet and said plane, the operation of the meter is improved. It has also been found that to connect the bimetal elements only at spaced positions therebetween or in equivalent manner, the meter will operate more effectively and retain its operating characteristics for a longer period of time.

Figure 1 of the accompanying drawings is a side elevational view of a damping magnet and the temperature-compensating device of my invention, Fig. 2 is an end elevational view of the structure shown in Fig. 1, with a portion of a watthour meter disk showing in its relation thereto, and Fig. 3 is a plan view of the structure shown in Fig. 2.

A permanent damping magnet 1 of the horse-shoe type is preferably formed to be of strap-like construction bent to the form of a loop embodying symmetrically-formed and related pole ends 2 having an air gap 3 therebetween in which an armature disk 4 of a watthour or similar meter is adapted to rotate. The median plane of the magnet 1, to which reference is herein made, is that plane longitudinally through the center of the magnet parallel to a side 5 of the magnet on which a temperature-compensating device 7 is mounted.

The device 7 comprises a bracket 8 of non-magnetic material, such as brass, that is of substantially U-shape and secured to the side 5 of the magnet 1, as by screws 10 and sleeves 11 of material similar to that of the bracket.

Strips 12 and 13, of metal having different coefficients of expansion, such as iron and hard aluminum, respectively, are spaced apart at positions therealong by plates 14 and connected, as by rivets extending through the plates 14 and the strips 12 and 13. This construction avoids the fatigue caused by intimately joining the adjacent surfaces of the elements, as above described, which tend to slide longitudinally on one another. Since such intimately-joined elements do not penetrate each other laterally to any appreciable extent, there is a sudden stressing of the film-like area therebetween which destroys the characteristics of the device, and consequently of the meter, by rendering the device unable to repeat corresponding movements in response to corresponding temperatures for a suitable period of time.

In the device, as employed in my invention, the elements 12 and 13 retain the individual and co-operating characteristics thereof, and therefor of the meter, by repeatedly moving similar distances in response to similar temperature changes over a longer period of time.

The thus joined elements 12 and 13 are connected, at one end 16, to one end 17 of the bracket 8, through the medium of a spacer member 19 and rivets or other means and extend therefrom substantially parallel to the side 5 of the magnet 1 beyond the other end 20 of the bracket. The end 20 and a member 21, riveted thereto, act as means for limiting lateral movement of the free end 22 of the bimetal element in both directions.

A magnetizable keeper, armature or shunt member 24, in the form of a knurled-head screw, is threadably mounted laterally through the outer end of the bimetallic element and has a plane outer surface 25 normally parallel to the side 5 of the magnet 1. Nuts 26 serve to lock the member 24 in adjusted position.

In operation, temperature variations cause the strips 12 and 13 to bend laterally from the fixed end 16 thereof as a base to move the free end 22 thereof and the member 24 toward and away from the pole ends 2 of the magnet 1. This movement causes a greater or less amount of flux to traverse the gap 3 and the armature disk 4, with the result that the latter will rotate substantially in accordance with the load irrespective of temperature changes.

While I have shown and described a particular form of my invention, changes may be effected therein without departing from the spirit and scope thereof, as set forth in the appended claims.

I claim as my invention:

1. In a meter, the combination with a movable element and a stationary damping magnet therefor, of an elongated temperature-responsive movable element extending substantially parallel to the median plane of the magnet, and a magnetizable member disposed on the temperature-responsive element and movable thereby adjacent to the poles of the magnet in a direction substantially normal to said plane, said magnetizable member being also adjustably movable in the direction of its movement relative to the temperature-responsive element.

2. In a meter, the combination with a movable element and a stationary damping magnet therefor, of an elongated temperature-responsive movable element extending substantially parallel to the median plane of the magnet, a magnetizable member disposed on the temperature-responsive element and movable thereby adjacent to the poles of the magnet in a direction substantially normal to said plane, said magnetizable member being also adjustably movable in the direction of its movement relative to the temperature-responsive element, and means for limiting the movement of the magnetizable member.

3. In an induction meter, the combination with an armature disk and a damping magnet of substantially C-shape having pole portions at, and substantially equally spaced from, opposite sides of the disk adjacent to the perimeter of the disk, of an elongated bimetallic element rigidly secured at one end to said magnet and extending substantially parallel to the outer side of said magnet, the other end of said element being movable along a path substantially parallel to the plane of the disk adjacent to said pole portions, and a magnetizable member adjustably mounted on said other end co-operating with said pole portions in adjacent spaced relation thereto.

4. In an induction meter, the combination with an armature disk and a damping magnet of substantially C-shape having pole portions on opposite sides of the disk adjacent to the perimeter of the disk, of a supporting member of substantially U-shape secured at an intermediate portion to one side of said magnet, a bimetallic element secured at one end to one end of said supporting member and movable at its other end relative to said pole portions, the other end of said supporting member constituting stopping means for said other end of said element, and a magnetizable member carried by said other end of the element.

In testimony whereof, I have hereunto subscribed my name this 14th day of March, 1925.

PAUL PASCHEN.